(12) United States Patent
Han

(10) Patent No.: US 12,401,651 B2
(45) Date of Patent: Aug. 26, 2025

(54) INFORMATION PROCESSING SYSTEM, SETTING CHANGE METHOD, AND NON-TRANSITORY RECORDING MEDIUM

(71) Applicant: Xiaofeng Han, Kanagawa (JP)

(72) Inventor: Xiaofeng Han, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 326 days.

(21) Appl. No.: 18/105,820

(22) Filed: Feb. 4, 2023

(65) Prior Publication Data

US 2023/0275898 A1    Aug. 31, 2023

(30) Foreign Application Priority Data

Feb. 28, 2022    (JP) .................................. 2022-030233
Nov. 30, 2022    (JP) .................................. 2022-192445

(51) Int. Cl.
*H04L 9/40*    (2022.01)

(52) U.S. Cl.
CPC .................................. *H04L 63/102* (2013.01)

(58) Field of Classification Search
CPC .................................................... H04L 63/102
See application file for complete search history.

(56) References Cited

U.S. PATENT DOCUMENTS

| 2003/0149573 | A1* | 8/2003 | Lynton | .................. | G06Q 30/06 |
| | | | | | 705/302 |
| 2005/0210293 | A1* | 9/2005 | Ohtani | .................. | G06F 21/604 |
| | | | | | 726/5 |
| 2010/0182640 | A1* | 7/2010 | Daigo | ................ | H04N 1/00214 |
| | | | | | 358/1.15 |
| 2012/0011577 | A1* | 1/2012 | Mashimo | ................ | G06F 21/31 |
| | | | | | 726/7 |
| 2014/0372514 | A1* | 12/2014 | Doui | ..................... | G06F 3/1222 |
| | | | | | 709/203 |
| 2016/0350045 | A1* | 12/2016 | Sawada | ................. | G06F 3/1288 |
| 2017/0078293 | A1 | 3/2017 | Han | | |
| 2017/0255763 | A1 | 9/2017 | Han | | |
| 2019/0082058 | A1 | 3/2019 | Aoki | | |
| 2020/0372141 | A1 | 11/2020 | Song | | |

(Continued)

FOREIGN PATENT DOCUMENTS

| JP | 2019-049913 | 3/2019 |
| JP | 2021-051356 | 4/2021 |
| WO | WO2008/035450 A1 | 3/2008 |

OTHER PUBLICATIONS

European Search Report; Application EP23158354; Jul. 6, 2023.

*Primary Examiner* — Hee K Song
(74) *Attorney, Agent, or Firm* — Duft & Bornsen, PC

(57) ABSTRACT

An information processing system, a setting change method, and a non-transitory recording medium. The information processing system registers a plurality of access accounts for managing the plurality of information processing apparatuses, transmits, in response to receiving an acquisition request from a particular information processing apparatus of the plurality of information processing apparatuses, the plurality of access accounts to the particular information processing apparatus, determines whether the plurality of access accounts satisfy a requisite based on authority information set in the particular information processing apparatus and stores one of the plurality of access accounts that satisfies the requisite.

6 Claims, 9 Drawing Sheets

(56) References Cited

U.S. PATENT DOCUMENTS

2021/0092241 A1    3/2021   Yoshida et al.
2021/0099599 A1    4/2021   Han et al.
2022/0206726 A1    6/2022   Dohmae et al.
2022/0263976 A1    8/2022   Han

* cited by examiner

FIG. 5

| | Priority | Profile Name | Description | User Name | Association with Device |
|---|---|---|---|---|---|
| ☐ | 1 | default | | admin | Setting |
| ☐ | 2 | temp | Password is temp | admin | Setting |
| ☐ | 3 | jt-002 | | admin | Setting |
| ☐ | 4 | default2 | | admin | Setting |

Access Account Settings

Tabs: Device Administrator | SNMP

Buttons: Create Device Administrator | Other Menu ▼ | Change Priority (Raise) (Lower) | Reload

FIG. 6

Enter information of device administrator and
click "Create" to register new device administrator.

Profile Name*

Description

Use Name*

Password

Password (Confirmation)

Cancel

Create

FIG. 7

| | Priority | Prof... | ...scription | User Name | Association with Device |
|---|---|---|---|---|---|
| ☐ | 1 | default | | admin | Setting |
| ☑ | 2 | temp | Password is temp | admin | Setting |
| ☐ | 3 | jt-002 | | admin | Setting |
| ☐ | 4 | default2 | | admin | Setting |

Access Account Settings

Tabs: Device Administrator | SNMP

Buttons: Create Device Administrator | Other Menu ▼ (Delete Device Administrator) | Change Priority (Raise) (Lower) | Reload

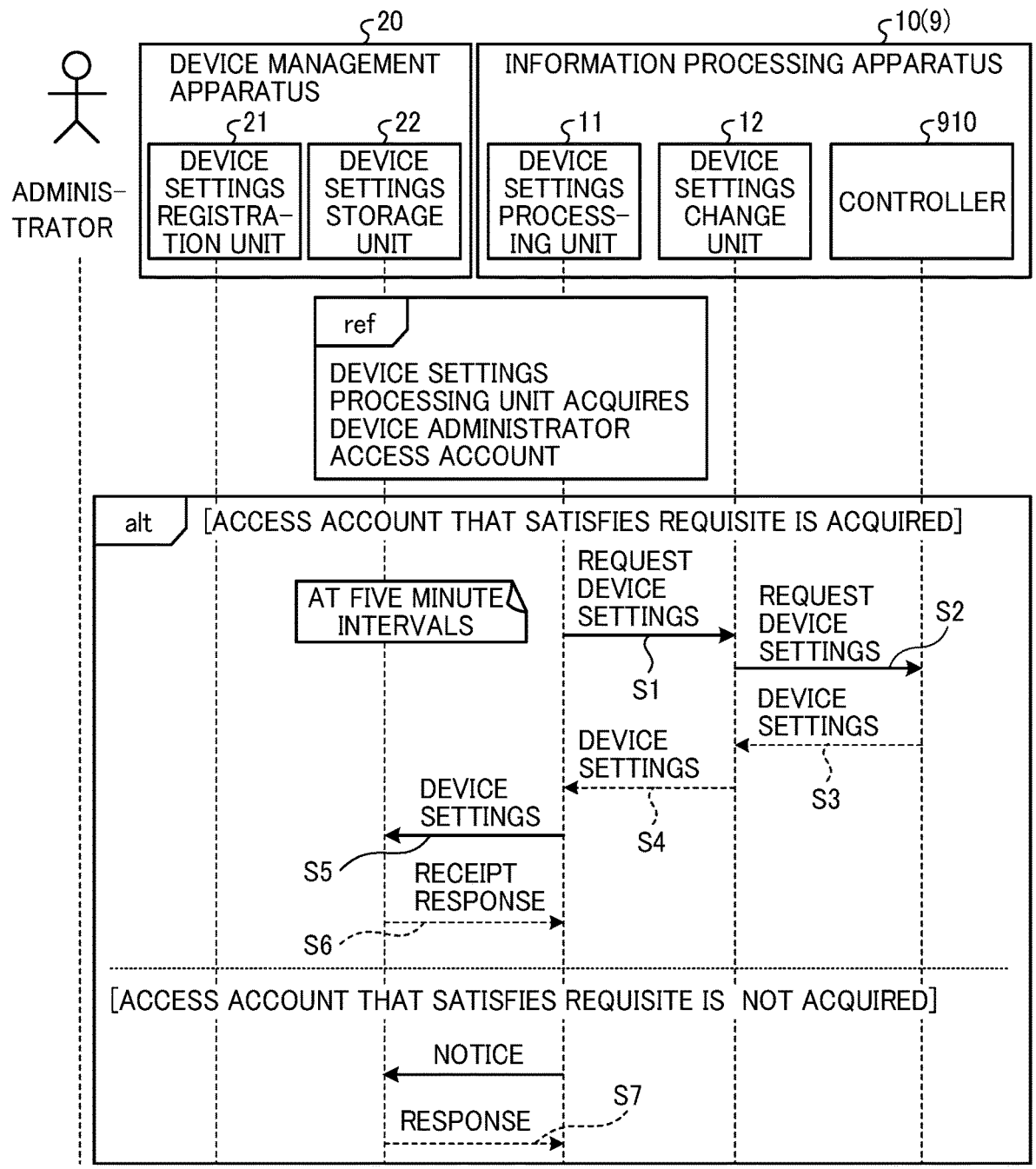

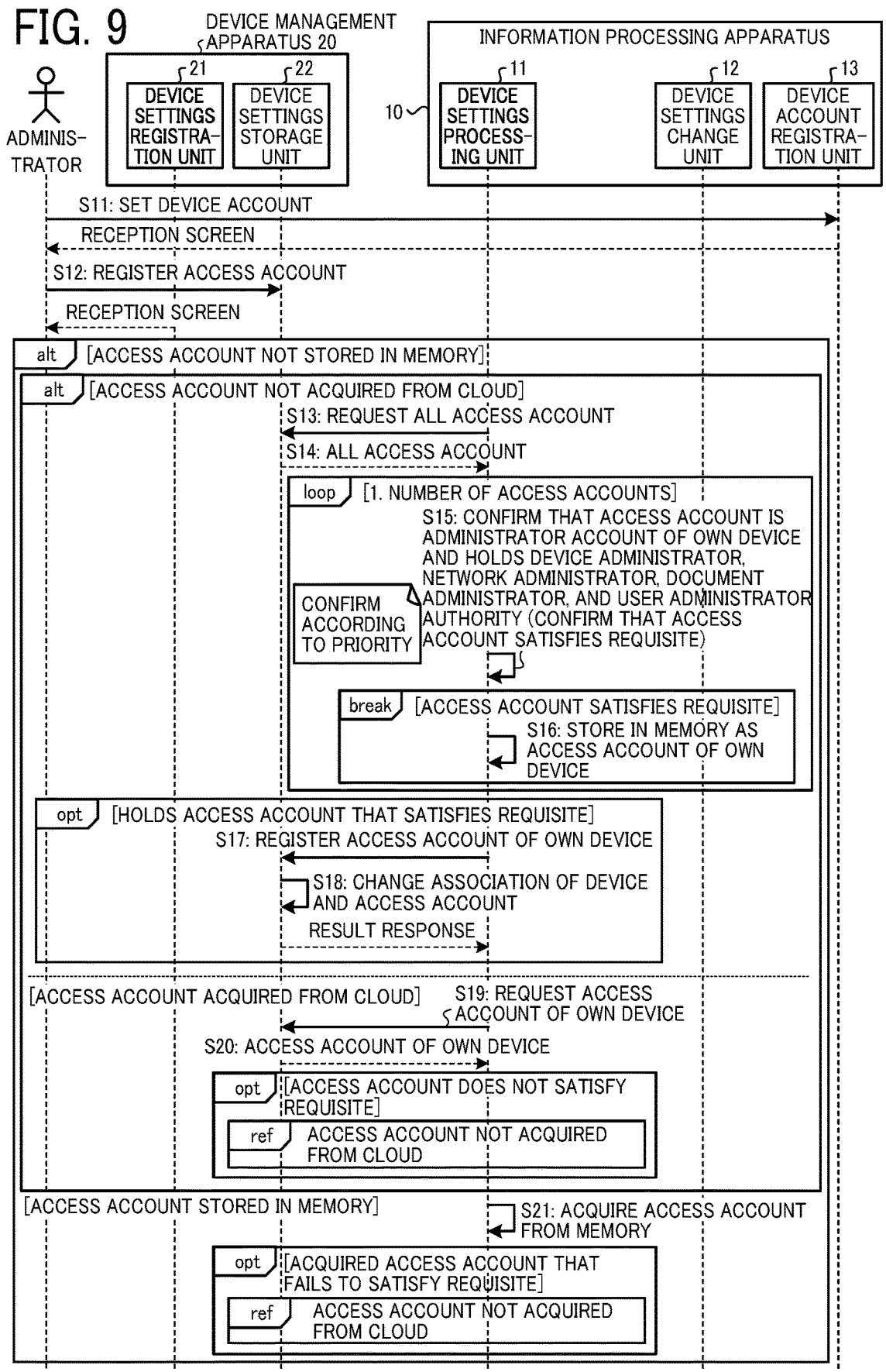

INFORMATION PROCESSING SYSTEM, SETTING CHANGE METHOD, AND NON-TRANSITORY RECORDING MEDIUM

CROSS-REFERENCE TO RELATED APPLICATIONS

This patent application is based on and claims priority pursuant to 35 U.S.C. § 119 (a) to Japanese Patent Application No. 2022-030233, filed on Feb. 28, 2022, and Japanese Patent Application No. 2022-192445, filed on Nov. 30, 2022, in the Japan Patent Office, the entire disclosure of which is hereby incorporated by reference herein.

BACKGROUND

Technical Field

The present disclosure relates to an information processing system, a setting change method, and a non-transitory recording medium.

Background Art

Device management apparatuses for managing a plurality of information processing apparatuses have been developed in such a way that the devices are managed from a server dedicated to the device management apparatus residing in a customer network or personal computer (PC) software installed on a PC of a customer user. This configuration is hereinafter referred to as an on-premises device management apparatus.

In addition, development and popularization of cloud services implemented on the internet have progressed, and development of device management apparatuses managing devices from a cloud server is also progressing. This configuration is hereinafter referred to as a cloud device management apparatus.

SUMMARY

Embodiments of the present disclosure describe an information processing system, a setting change method, and a non-transitory recording medium. The information processing system registers a plurality of access accounts for managing the plurality of information processing apparatuses, transmits, in response to receiving an acquisition request from a particular information processing apparatus of the plurality of information processing apparatuses, the plurality of access accounts to the particular information processing apparatus, determines whether the plurality of access accounts satisfy a requisite based on authority information set in the particular information processing apparatus and stores one of the plurality of access accounts that satisfies the requisite.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a diagram illustrating an example of a user interface (UI) for setting an access account;

FIG. 6 is a diagram illustrating an example of the UI for creating a new access account;

FIG. 7 is a diagram illustrating an example of the UI for deleting the access account;

FIG. 8 is a sequence diagram illustrating a setting change process for the information processing apparatus; and FIG. 9 is a sequence diagram illustrating an access account acquisition process of the information processing apparatus.

Figure 1:
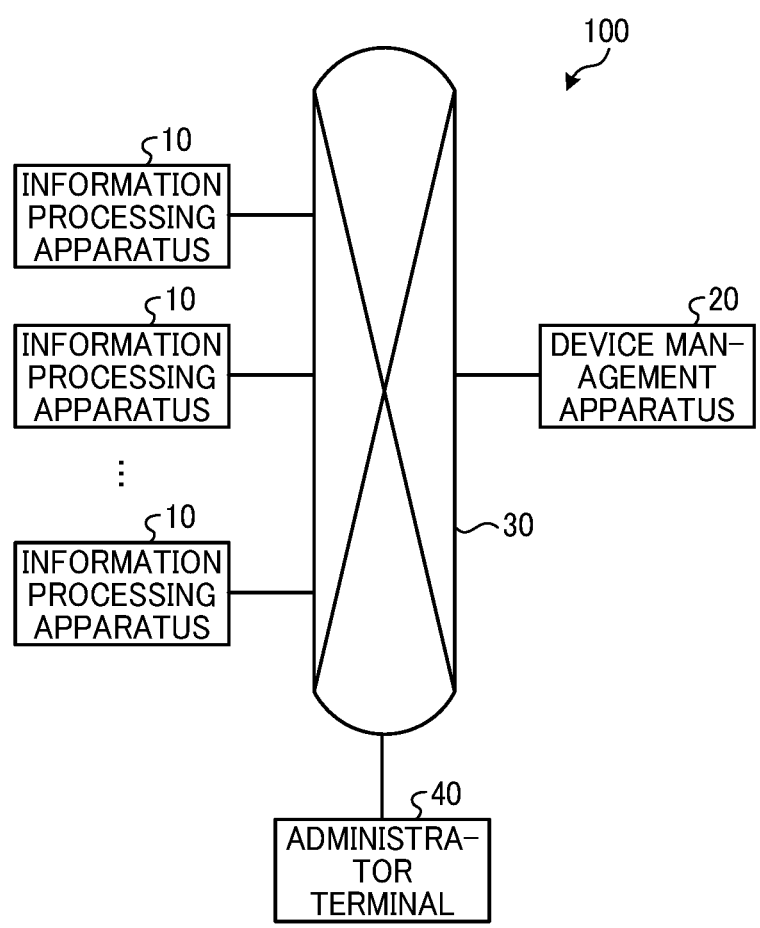
FIG. 1 is a block diagram illustrating a configuration of an information processing system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of an information processing system, a device management apparatus, an information processing apparatus, a setting change method, and a non-transitory recording medium are described in detail below with reference to accompanying drawings.

FIG. 1 is a block diagram illustrating a configuration of an information processing system 100 according to the present embodiment.

As illustrated in FIG. 1, an information processing system 100 includes a plurality of information processing apparatuses 10, a device management apparatus 20, and an administrator terminal 40 which is a PC.

The information processing apparatus 10 is, for example, an image forming apparatus such as a multifunction peripheral (MFP) including at least two functions out of a copy function, a print function, a scan function, and a facsimile function.

The device management apparatus 20 is an information system for device management for managing the information processing apparatus 10 through the firewall in a customer network 30. The device management apparatus 20 is implemented by one or more PCs (servers) 5 provided on a cloud service implemented on the internet.

A hardware configuration of an MFP 9, which is an example of the information processing apparatus 10 is described in the following.

Figure 2:
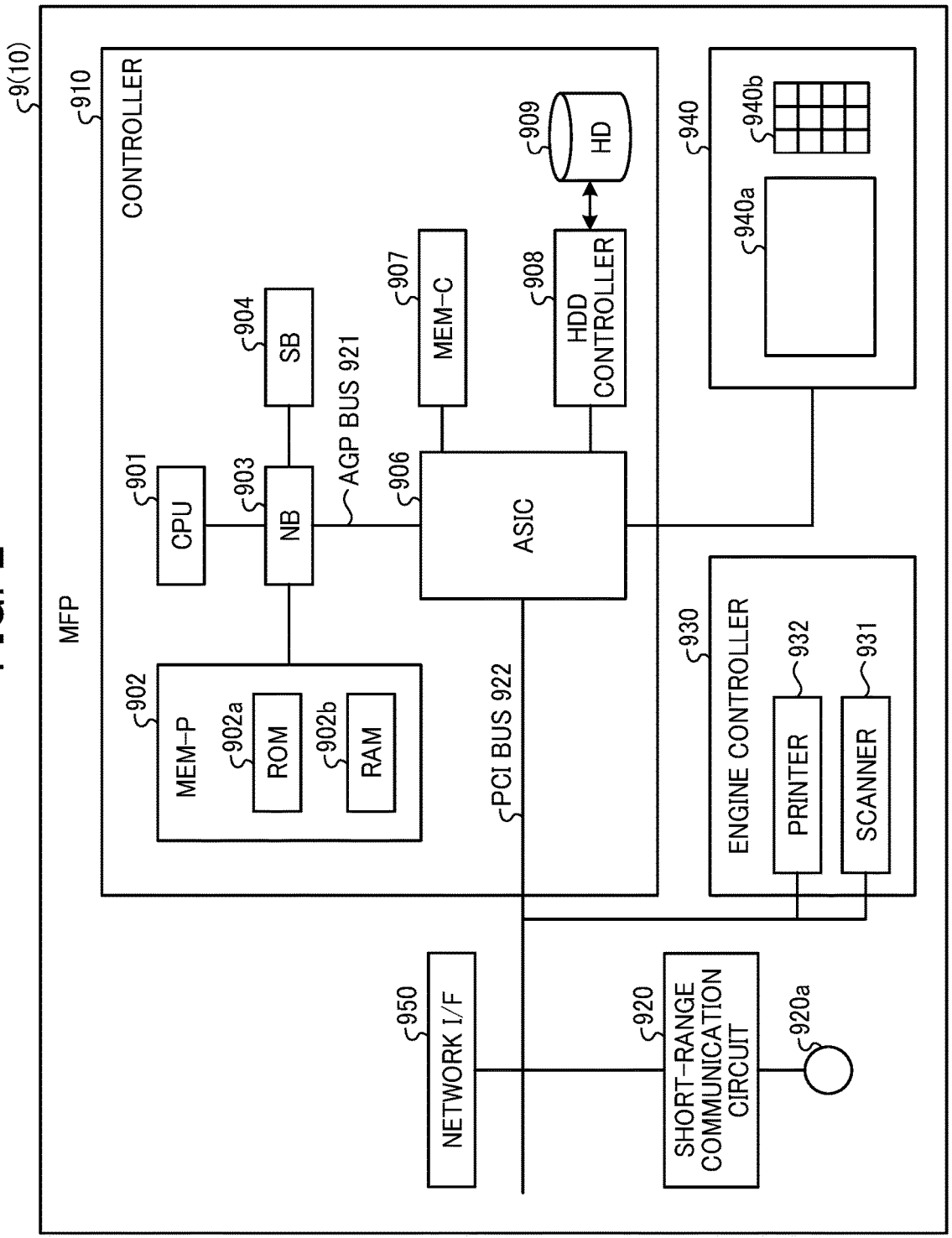
FIG. 2 is a block diagram illustrating a hardware configuration of a multifunction peripheral (MFP), which is an example of an information processing apparatus.

FIG. 2 is a block diagram illustrating a hardware configuration of the MFP 9, which is an example of the information processing apparatus 10.

As illustrated in FIG. 2, the MFP 9, which is the information processing apparatus 10, includes a controller 910 included in a device main body, a short-range communication circuit 920, an engine controller 930, a control panel 940, and a network interface (I/F) 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907 as a storage unit, a hard disk drive (HDD) controller 908, and a hard disk (HD) 909 as another storage unit. The NB 903 and the ASIC 906 are connected through an Accelerated Graphics Port (AGP) bus 921.

The CPU 901 is a processor that performs overall control of the MFP 9. The NB 903 connects the CPU 901 with the MEM-P 902, SB 904, and AGP bus 921. The NB 903 includes a memory controller for controlling reading or writing of various data with respect to the MEM-P 902, a Peripheral Component Interconnect (PCI) master, and an AGP target.

The MEM-P 902 includes a read only memory (ROM) 902a as a memory that stores program and data for implementing various functions of the controller 910. The MEM-P 902 further includes a RAM 902b as a memory that deploys the program and data, or as a drawing memory that stores drawing data for printing. The program stored in the ROM 902a may be stored in any computer-readable storage medium, such as a Compact Disc-Read Only Memory (CD-ROM), Compact Disc-Recordable (CD-R), or Digital Versatile Disc (DVD), in a file format installable or executable by the computer for distribution.

The SB 904 is a bridge for connecting the NB 903 with a peripheral component interconnect (PCI) device or a peripheral device. The ASIC 906 is an integrated circuit (IC) dedicated to an image processing use, and connects the AGP bus 921, a PCI bus 922, the HDD controller 908, and the MEM-C 907. This ASIC 906 includes a PCI target and AGP master, an arbiter (ARB) that forms the core of the ASIC 906, a memory controller that controls the MEM-C 907, and multiple Direct Memory Access Controllers (DMACs) that rotate image data using hardware logic, and a PCI unit that transfers data between the scanner 931 and the printer 932 through the PCI bus 922. The ASIC 906 may be connected to a Universal Serial Bus (USB) interface, or an Institute of Electrical and Electronics Engineers 1394 (IEEE1394) interface.

The MEM-C 907 is a local memory used as a buffer for image data to be copied or code image. The HD 909 is a storage that stores image data, font data used during printing, and forms. The HDD controller 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 is provided with a short-range communication antenna 920a. The short-range communication circuit 920 is a communication circuit that communicates in compliance with Near Field Communication (NFC), BLUETOOTH (registered trademark) and the like.

The engine controller 930 includes a scanner 931 and a printer 932. The control panel 940 includes a display panel 940a and an operation panel 940b. The display panel 940a is implemented by, for example, a touch panel that displays current settings or a selection screen and receives a user input. The operation panel 940b includes a numeric keypad that receives set values of various image forming parameters such as image density parameter and a start key that accepts an instruction for starting copying. The controller 910 controls entire operation of the MFP 9. For example, the controller 910 controls rendering, communication, or user inputs to the control panel 940. The scanner 931 or the printer 932 includes image processing functions such as error diffusion processing and gamma conversion processing.

In response to an instruction to select a specific application through the control panel 940, for example, using a mode switch key, the MFP 9 selectively performs a document box function, a copy function, a print function, and a facsimile function. The document box mode is selected when the document box function is selected, the copy mode is selected when the copy function is selected, the print mode is selected when the print function is selected, and the facsimile mode is selected when the facsimile function is selected.

The network I/F 950 is an interface for performing data communication using the customer network 30. The short-range communication circuit 920 and the network I/F 950 are electrically connected to the ASIC 906 through the PCI bus 922.

A hardware configuration of the PC (server) 5 for implementing the device management apparatus 20 provided on the cloud service is described in the following.

Figure 3:
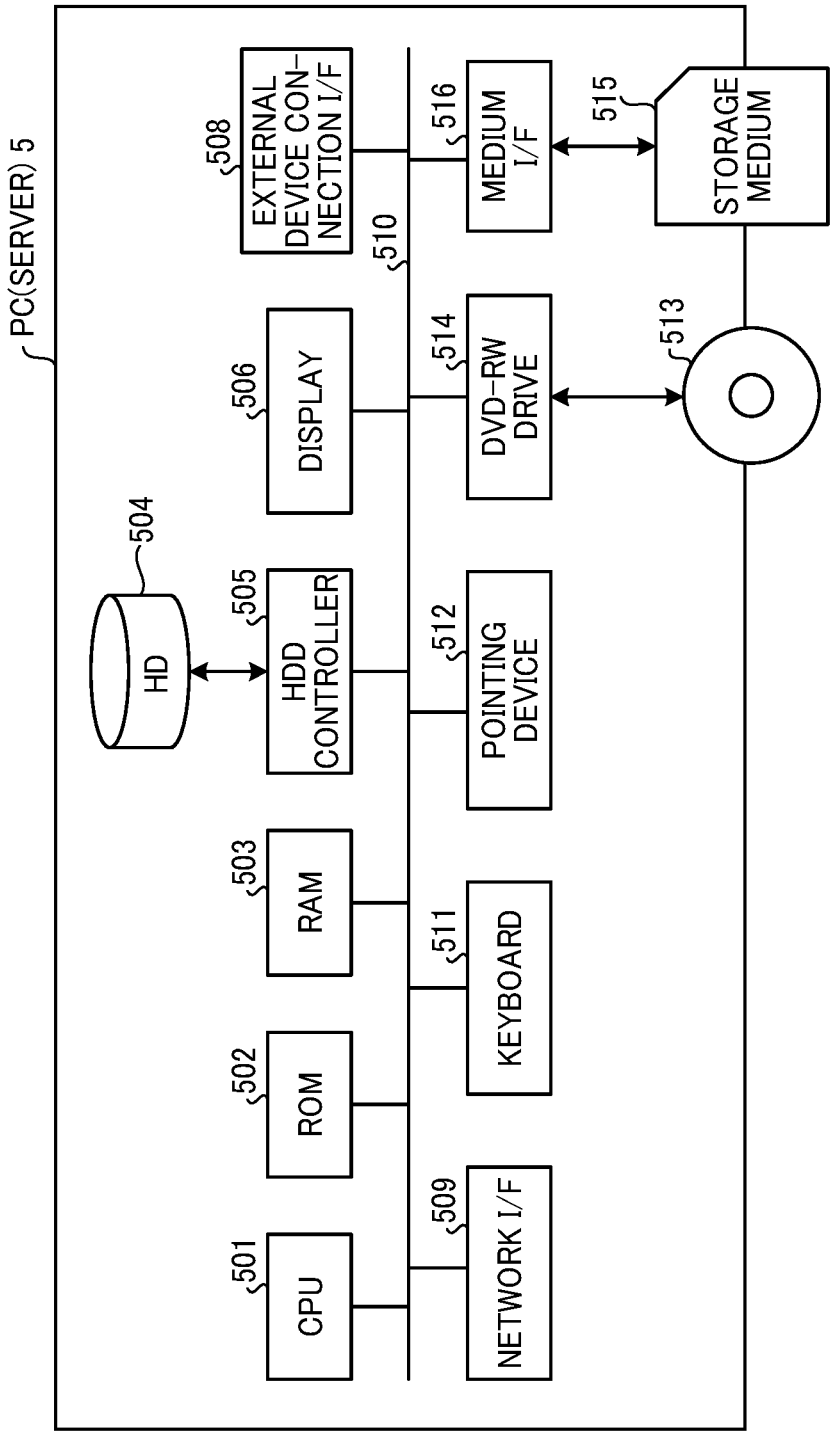
FIG. 3 is a block diagram illustrating a hardware configuration of a PC (server)

FIG. 3 is a block diagram illustrating the hardware configuration of the PC (server) 5. A description is now given of the hardware configuration of the server 5.

As illustrated in FIG. 3, the server 5 is implemented by a computer and includes a CPU 501, a ROM 502, a RAM 503, a hard disk (HD) 504, a hard disk drive (HDD) controller 505, a display 506, an external device connection I/F 508, a network I/F 509, a bus line 510, a keyboard 511, a pointing device 512, a Digital Versatile Disc-Rewritable (DVD-RW) drive 514, and a medium I/F 516.

The CPU 501 controls entire operation of the server 5. The ROM 502 stores a control program such as an initial program loader (IPL) to boot the CPU 501. The RAM 503 is used as a work area for the CPU 501. The HD 504 stores various data such as programs. The HDD controller 505 controls reading and writing of various data from and to the HD 504 under control of the CPU 501. The display 506 displays various information such as a cursor, menu, window, character, or image. The external device connection I/F 508 is an interface for connecting various external devices. Examples of the external devices include, but are not limited to, a USB memory and a printer. The network I/F 509 is an interface for performing data communication using the customer network 30. The bus line 510 is an address bus, a data bus, or the like for electrically connecting each component such as the CPU 501 illustrated in FIG. 3.

The keyboard 511 is an example of an input device provided with a plurality of keys for allowing a user to input characters, numerals, or various instructions. The pointing device 512 is an example of the input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a Digital Versatile Disc-Recordable (DVD-R) or the like. The medium I/F 516 controls reading and writing (storing) of data from and to a storage medium 515 such as a flash memory.

A description is now given of functions implemented by the controller 910 of the MFP 9 that is the information processing apparatus 10, according to the programs stored in the ROM 902a, and functions implemented by the CPU 501 of the server 5 implementing the device management apparatus 20 according to the programs stored in the ROM 502 and the HD 504.

Figure 4:
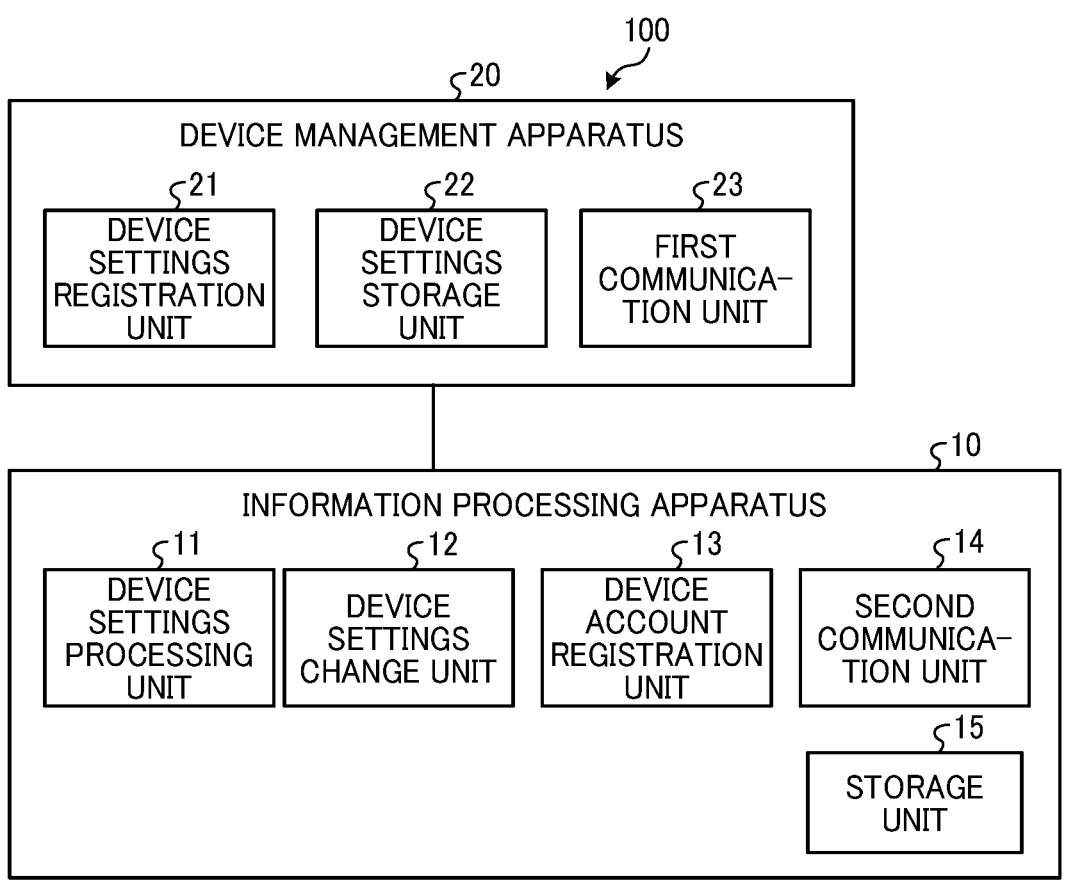
FIG. 4 is a block diagram illustrating a functional configuration of the information processing system.

FIG. 4 is a block diagram illustrating a functional configuration of the information processing system 100. As illustrated in FIG. 4, the device management apparatus 20 includes a device settings registration unit 21 as an example of a first registration unit, a first communication unit 23 as an example of a transmission unit, and a device settings storage unit 22. The MFP 9 that is the information processing apparatus 10 includes a device settings processing unit 11 that is an example of a determination unit, a device settings change unit 12, a device account registration unit 13 that is an example of a second registration unit, a second communication unit 14, and a storage unit 15.

The device settings registration unit 21 provides the administrator terminal 40 with a setting change execution screen, which is an input screen for requesting to change the device settings of the information processing apparatus 10. Further, the device settings registration unit 21 displays a change result of the device settings of the information processing apparatus 10 on the administrator terminal 40 as a device settings confirmation screen. A setting change request for the information processing apparatus 10 is assumed to be received from the administrator terminal 40.

The device settings storage unit 22 stores the device settings of the information processing apparatus 10 received from the device settings processing unit 11 in an access account storage area for the information processing apparatus. The device settings storage unit 22 manages requests for changing the device settings of the information processing apparatus 10 input from the administrator terminal 40. Further, the device settings storage unit 22 stores the access account in the device settings storage unit 22 by receiving registration of the access account from the user. The first communication unit 23 transmits an instruction to change the device settings of the information processing apparatus 10 to the device settings processing unit 11. Also, a transmission request including device settings is received from the second communication unit 14.

The second communication unit 14 acquires device settings of the information processing apparatus 10 from the device settings change unit 12.

Also, the second communication unit 14 periodically transmits a transmission request including the device settings of the information processing apparatus 10 to the device settings registration unit 21. The device settings processing unit 11 executes processing such as changing device settings according to the type of instruction received from the first communication unit 23. In response to receiving an instruction to change the device settings of the information processing apparatus 10 from the first communication unit 23, the device settings processing unit 11 transfers the instruction to the device settings change unit 12.

The device settings change unit 12 acquires device settings from the controller 910 included in the device main body of the information processing apparatus 10. The device settings change unit 12 changes device settings managed by the controller 910 included in the device main body of the information processing apparatus 10 based on the change instruction received from the first communication unit 23. The device account registration unit 13 receives registration of a device account from a user and stores the device account. The storage unit 15 stores the device account registered by the device account registration unit 13 and further stores the access account acquired from the device management apparatus 20.

In the case a customer owns a plurality of information processing apparatuses 10 and wants to change the device settings of those information processing apparatuses 10, the customer may wish to apply the same device settings to all the information processing apparatuses 10. In this case, the customer desires to collectively change the settings of all the information processing apparatuses 10 or a plurality of specific information processing apparatuses 10 with one setting change operation, instead of changing the settings of the information processing apparatuses 10 one by one.

Using a common account for multiple information processing apparatuses 10 may be efficient when changing the device settings of the information processing apparatus 10, but a plurality of device accounts may be set in the information processing apparatus 10 in proportion to the number of devices and the number of departments.

In order to enable the customer's device administrator to enter the access account settings to be applied to all the information processing apparatuses 10 collectively through the administrator terminal 40, the device settings registration unit 21 of the device management apparatus 20 displays a setting change execution screen, which is an access account setting UI for defining the setting contents of the access account to be applied to all information processing apparatuses 10 or a plurality of specific information processing apparatuses 10 on the administrator terminal 40, and causes the customer's device administrator to input a settings change instruction to the information processing apparatus 10 whose setting is to be changed through the administrator terminal 40 using the access account.

FIG. 5 is a diagram illustrating an example of the setting UI of the access account. As illustrated in FIG. 5, a setting change execution screen, which is the setting UI, includes five items of information, "Priority", "Profile Name", "Description", "User Name", and "Association with Device". The priority is information indicating order of determination in the device settings processing unit 11. The device settings processing unit 11 determines whether the access account satisfies a predetermined requisite in the order indicated by the priority, as described below. The profile name is information for identifying the device settings. The description is any comment entered by the administrator. The user name is information for identifying the administrator, such as a name or an identifier (ID). The association with the device is information related to the information processing apparatus 10 that is stored in association with the access account. Note that the association with the device is configured by an input component such as a setting button. In response to an operation of the setting button by the administrator through the administrator terminal 40, the device management apparatus 20 provides the administrator terminal 40 with information identifying the information processing apparatus 10 stored in association with the access account. This allows the administrator to confirm or change the information processing apparatus 10 that is stored in association with the access account.

Each information processing apparatus 10 is associated with at least one administrator setting of the information processing apparatus 10.

Here, the administrator setting is information on at least one of the priority, profile name, description, user name, and association with device. A default administrator setting of the information processing apparatus 10 is associated immediately after the registration of the information processing apparatus 10. Changes to the settings of any registered information processing apparatus 10 may be made using the setting button in the "association with device" column. Further, the information is automatically updated through registration by the device settings processing unit 11 of the information processing apparatus 10, as described below. In the present embodiment, the association registered later becomes effective.

Although the priority can be changed and the order of transmitting the access accounts to the information processing apparatus 10 and determining whether the access accounts satisfy the requisite changes, but the association remains unchanged.

Also, as described above, the administrator settings for a plurality of information processing apparatuses 10 can be registered, but the default administrator is to be set for the information processing apparatus 10.

Creation and deletion of the access account is described in the following.

FIG. 6 is a diagram illustrating an example of the UI for creating a new access account. The setting change execution screen, which is the UI for creating the new access account, sets the user name and password of the device administrator of the information processing apparatus 10 as illustrated in FIG. 6. The default administrator settings of the information processing apparatus 10 include the following.

Profile name: default (unchangeable)
Description: empty
User name: admin
Password: empty FIG. 7 is a diagram illustrating an example of the UI for deleting the access account. As illustrated in FIG. 7, in the setting change execution screen, which is a UI for deletion, by selecting "Delete Device Administrator" in "Other Menu", the access account for the information processing apparatus 10 whose check box is checked is deleted.

With the above functional configuration, since the device management apparatus 20 transmits the change request as a response to the request from the information processing apparatus 10, the change request for the settings of the information processing apparatus 10 is delivered to the information processing apparatus 10 placed in the customer network 30 protected by the customer's firewall.

A setting change process for the information processing apparatus 10 is described in the following.

FIG. 8 is a sequence diagram illustrating a setting change process for the information processing apparatus 10.

The information processing system 100 of the present embodiment initiates communication from the information processing apparatus 10 to the device management apparatus 20 to enable communication through the firewall within the customer network 30. More specifically, in steps S1 and S2, the device settings processing unit 11 of the information processing apparatus 10 transmits a device settings request to the controller 910 included in the device main body, periodically, for example, at five minute intervals, through the device settings change unit 12 as illustrated in FIG. 8. In steps S3 and S4, the device settings processing unit 11 of the information processing apparatus 10 receives the device settings information from the controller 910 included in the device main body through the device settings change unit 12.

That is, the device settings processing unit 11 of the information processing apparatus 10 transmits to the device management apparatus 20 through the second communication unit 14, a transmission request including current device settings of the own device, periodically, for example, at five minute intervals.

In step S5, the device settings storage unit 22 of the device management apparatus 20 receives the device settings from the information processing apparatus 10 through the first communication unit 23. The device settings may include identification information for identifying the information processing apparatus 10.

In response to receiving the device settings from the information processing apparatus 10, the device settings storage unit 22 of the device management apparatus 20 checks whether the administrator terminal 40 has received a request to change the settings of the information processing apparatus 10. That is, the administrator terminal 40 transmits a change request to the information processing apparatus 10 by accessing the device management apparatus 20 in advance. The change request includes an item of the device settings to be changed, a setting value after the change, and the identification information of the information processing apparatus 10 to change the device settings. In the case the device settings storage unit 22 of the device management apparatus 20 stores the device settings change request for the information processing apparatus 10, a response to the communication from the information processing apparatus 10 including the device settings change request is returned to the information processing apparatus 10 through the first communication unit 23 in step S6. Note that the device settings storage unit 22 compares the device settings included in the transmission request with the device settings included in the change request, transmits a response in the case the setting value of the setting item is different, and omits the response in the case the setting value of the setting item is the same.

On the other hand, in the case the device settings storage unit 22 of the device management apparatus 20 has not acquired the access account that satisfies the requisite, instead of transmitting the device settings request to the device settings change unit 12, a notification indicating that there is no account that satisfies the requisite is transmitted to the information processing apparatus 10 in step S7.

A process for acquiring the access account of the information processing apparatus 10 is described in detail in the following.

FIG. 9 is a sequence diagram illustrating an access account acquisition process of the information processing apparatus 10. In step S11, the device administrator registers a device account in the device account registration unit 13, as illustrated in FIG. 9. A user name, password, and authority information are set for the device account. In step S12, the device settings storage unit 22 registers an access account in the device management apparatus 20 through the UI for creating the new access account of the device management apparatus 20 illustrated in FIG. 6.

Here, the device account is an account registered in the information processing apparatus 10 and the access account is an account registered in the device management apparatus 20. The access account corresponds to the device account of any one of the information processing apparatuses 10 managed by the device management apparatus 20 or one of the information processing apparatuses 10.

Note that a plurality of device accounts can be registered in the information processing apparatus 10. One or more of a plurality of authorities such as device administrator authority, network administrator authority, document administrator authority, and user administrator authority can be registered for each device account. The device administrator authority is the authority of the administrator who manages the information processing apparatus 10. The network administrator authority is the authority of an administrator who manages the network of the customer environment to which the information processing apparatus 10 is connected. The document manager authority is the authority of an administrator who manages document data processed by the information processing apparatus 10. The user administrator authority is the authority of an administrator who manages users.

Also, a plurality of access accounts can be registered in the device management apparatus 20. When registering the access account in the device management apparatus 20, an access account having at least information identifying the user such as the user name or the user ID matching the device account registered in the information processing apparatus 10 is to be registered. Here, matching of the user names of the device account and the access account may be referred to as the device account and the access account correspond to each other.

Note that when a plurality of device accounts are registered in the information processing apparatus 10, the device management apparatus 20 can register an access account corresponding to at least one device account registered in the information processing apparatus 10. When the device account is registered in each of the plurality of information processing apparatuses 10, the access account corresponding to at least one device account registered in each of the plurality of information processing apparatuses 10 can be registered.

As illustrated in FIG. 9, the device settings processing unit 11 of the information processing apparatus 10 transmits an acquisition request requesting all access accounts to the device settings storage unit 22 of the device management apparatus 20 through the second communication unit 14 in step S13, and acquires all access accounts from the device settings storage unit 22 in step S14. That is, the first communication unit transmits the access accounts to the second communication unit. Here, the access account is an administrator account registered in the information processing apparatus 10 to be managed. In the case the plurality of information processing apparatuses 10 are to be managed, the access account corresponding to the device account registered in each of the plurality of information processing apparatuses 10 are to be registered in advance in the device settings storage unit 22. In addition to the access account corresponding to the device account pre-registered in the information processing apparatus 10 that is the source of the request, the device settings storage unit 22 transmits the access accounts corresponding to the device accounts registered in other information processing apparatuses 10 to the information processing apparatus 10 through the first communication unit 23. The device settings storage unit 22 may transmit all access accounts registered in the device settings storage unit 22 to the information processing apparatus 10, but the transmission to the information processing apparatus 10 may be made in the order indicated by the priority set in the access account. In this case, after transmitting the access account to the information processing apparatus 10, the device settings storage unit 22 transmits the next highest priority access account to the information processing apparatus 10 in response to a request from the information processing apparatus 10.

In step S15, the device settings processing unit 11 of the information processing apparatus 10 determines whether each of the acquired access accounts satisfies the requisite. Here, the device settings processing unit 11 determines whether the access account acquired from the device management apparatus 20 corresponds to the device account registered in the information processing apparatus 10. For example, in the case the user name included in the access account matches the user name included in the device account, the device settings processing unit 11 of the information processing apparatus 10 determines that the access account corresponds to the device account. Note that the determination that the access account corresponds to the device account may be made in the case both the user name and password included in the access account match the user name and password included in the device account.

Furthermore, the device settings processing unit 11 determines whether the device account corresponding to the access account has a predetermined authority. For example, in the case all of the device administrator authority, network administrator authority, document administrator authority, and user administrator authority are set for the device account, a determination that the user has the predetermined authority is made. The device settings processing unit 11 determines that the access account satisfies the requisite in the case the device account corresponding to the access account acquired from the device management apparatus 20 is registered in the information processing apparatus 10, and the device account has the specified authority. Note that the device settings processing unit 11 makes the above determination for each access account acquired from the device management apparatus 20. Further, the device settings processing unit 11 makes determination of the above-described requisite in the order according to the priority set in the access account. Based on a determination that one of the plurality of access accounts acquired from the device management apparatus 20 satisfies the requisite, the device settings processing unit 11 stops making determination of the remaining access accounts that have not yet been determined.

Thereby, the device settings processing unit 11 specifies one access account among the plurality of access accounts acquired from the device management apparatus 20.

As soon as the access account satisfying the requisite is found, the device settings processing unit 11 of the information processing apparatus 10 stores the access account in the storage unit 15 in step S16. Here, the storage unit 15 may store the device account corresponding to the access account as the access account. In step S17, the device settings processing unit 11 of the information processing apparatus 10 transmits a registration request including the device settings of the access account and the identification information of the information processing apparatus 10 to the device settings storage unit 22 of the device management apparatus 20 through the second communication unit 14.

In step S18, the device settings processing unit 11 of the information processing apparatus 10 associates and stores the access account received from the information processing apparatus 10 through the first communication unit 23 and the identification information of the information processing apparatus 10 that is the transmission source. As a result, the identification information of the information processing apparatus 10 is written in the access account storage area for each information processing apparatus 10 of the device management apparatus 20.

Thereafter, when the device settings processing unit 11 of the information processing apparatus 10 determines that the access account is associated with the identification information of the information processing apparatus 10 in the memory, the access account is used to communicate with the information processing apparatus 10.

On the other hand, in the case the access account is not stored in the memory, but the history information indicating that the access account acquired from the device management apparatus 20 is stored, the device settings processing unit 11 of the information processing apparatus 10 requests the access account for the information processing apparatus 10 from the device settings storage unit 22 of the device management apparatus 20 in step S19, and acquires the access account of the information processing apparatus 10 from the device settings storage unit 22 of the device management apparatus 20 in step S20.

In the case an access account is stored in the memory, the device settings processing unit 11 of the information processing apparatus 10 acquires the access count in step S21. However, in one example, the authority information set in the device account corresponding to the acquired access account fails to satisfy the prescribed requisite. For example, the authority information of the device account is changed after being stored as an access account in the past. In this case, the processing from step S13 described above can be executed.

As described above, according to the present embodiment, an account can be set in the information processing apparatus 10 managed by the device management apparatus 20 in the cloud. According to the present embodiment, determination of whether a plurality of different access accounts for each managed device acquired from the device management apparatus 20 satisfies the requisite can be made, the access account that satisfies the requisite is stored in the storage unit 15, and the stored access account is valid until the application installed in the information processing apparatus 10 or the information processing apparatus is shut down. Note that, according to the present embodiment, even when the information processing apparatus 10 or the application installed in the information processing apparatus 10 is restarted, the access account can be acquired again from the device management apparatus 20.

A program to be executed by the information processing apparatus 10 or the device management apparatus 20 according to the present embodiment is recorded as a file of an installable format or an executable format on a non-transitory computer-readable recording medium such as a Compact Disc Read-Only Memory (CR-ROM), a flexible disk (FD), a Compact Disc Recordable (CD-R), or a Digital Versatile Disc (DVD).

In another example, the program to be executed by the information processing apparatus 10 or the device management apparatus 20 according to the present embodiment is stored on a computer connected to a network such as the internet and is provided by being downloaded through the network. Also, the program executed by the information processing apparatus 10 or the device management apparatus 20 of the present embodiment may be provided or distributed through a network such as the internet.

Further, the information processing apparatus 10 or the device management apparatus 20 of the present embodiment may be configured to be incorporated in a ROM or the like in advance and provided.

The program to be executed by the information processing apparatus 10 or the device management apparatus 20 according to the present embodiment is preinstalled in a ROM or the like and provided.

In the above embodiments, an example in which the information processing apparatus 10 of the present disclosure is the MFP including at least two of a copy function, a print function, a scan function, and a facsimile function is described, but the above embodiments may be applied to any image forming apparatuses such as a printer, a scanner, and a facsimile.

Note that the information processing apparatus 10 is not limited to the image forming apparatus as long as the apparatus includes the communication function. The information processing apparatus 10 includes, for example, an output device such as a projector (PJ), an interactive white board (IWB: a white board having an electronic whiteboard function capable of mutual communication), and a digital signage, a head up display (HUD) device, an industrial machine, an imaging device, a sound collecting device, a medical device, a network home appliance, an automobile (connected car), a notebook PC, a mobile phone, a smartphone, a tablet terminal, a game console, a personal digital assistant (PDA), a digital camera, a wearable PC, and a desktop PC.

The apparatuses or devices described in one or more embodiments are just one example of plural computing environments that implement the one or more embodiments disclosed herein.

In some embodiments, the device management apparatus 20 includes multiple computing devices, such as a server cluster. The multiple computing devices are configured to communicate with one another through any type of communication link, including a network, shared memory, etc., and perform the processes disclosed herein. In substantially the same manner, for example, the information processing apparatus 10 includes such multiple computing devices configured to communicate with one another.

Further, the device management apparatus 20 and the information processing apparatus 10 can be configured to share the disclosed processing steps, for example, FIGS. 8 and 9, in various combinations. For example, a process executed by a given unit may be executed by the information processing apparatus 10. Similarly, the functions of a given unit can be performed by the information processing apparatus 10. Also, each element of the device management apparatus 20 and the information processing apparatus 10 may be integrated into one server apparatus, or may be divided into a plurality of apparatuses.

Aspects of the present disclosure are, for example, as follows.

According to a first aspect, an information processing system including a plurality of information processing apparatuses and a device management apparatus that manages the plurality of information processing apparatuses includes, a first registration unit for registering an access account, a transmission unit for transmitting a plurality of access accounts to the information processing apparatus in response to receiving an acquisition request from the information processing apparatus, a determination unit for determining whether the plurality of access accounts satisfy a requisite, and a storage unit for storing one of the plurality of access accounts that satisfies the requisite based on the determination by the determination unit that the requisite is satisfied.

According to a second aspect, in the information processing system of the first aspect, the first registration unit stores the access account in an access account storage area for the information processing apparatus, and in response to receiving an acquisition request from the information processing apparatus, the transmission unit transmits the access account stored in the access account storage area.

According to a third aspect, the information processing system of the first aspect or the second aspect further includes a second registration unit for registering a device account including user identification information, and the determination unit determines that the requisite is satisfied when the user identification information included in the access account matches the user identification information included in the device account.

According to a fourth aspect, in the information processing system of the third aspect, the second registration unit further registers the device account including user authority information, and the determination unit determines that the requisite is satisfied when the user authority information included in the device account corresponding to the access account includes a predetermined authority.

According to a fifth aspect, in the information processing system of any one of the first aspect to the fourth aspect, the determination unit re-acquires the access account from the device management apparatus even when the information processing apparatus or an application installed in the information processing apparatus is restarted.

According to a sixth aspect, in an information processing system including a plurality of information processing apparatuses and a device management apparatus that manages the plurality of information processing apparatuses, the device management apparatus includes a registration unit for registering an access account, a transmission unit for transmitting a plurality of access accounts to the information processing apparatus in response to receiving an acquisition request from the information processing apparatus, and the information processing apparatus includes a determination unit for determining whether the plurality of access accounts satisfy a requisite, and a storage unit for storing one of the plurality of access accounts that satisfies the requisite based on a determination by the determination unit that the requisite is satisfied.

According to a seventh aspect, a device management apparatus that manages a plurality of information processing apparatuses includes, a registration unit for registering an access account, and a transmission unit for transmitting a plurality of access accounts to the information processing apparatus in response to receiving an acquisition request from the information processing apparatus.

According to an eighth aspect, an information processing apparatus managed by a device management apparatus includes, a determination unit for determining whether a plurality of access accounts satisfy a requisite, and a storage unit for storing an access account that satisfies the requisite based on a determination by a determination unit that the requisite is satisfied.

According to a ninth aspect, a setting change method in an information processing system including a plurality of information processing apparatuses and a device management apparatus that manages the plurality of information processing apparatuses includes, a registration step of registering an access account, a transmission step of transmitting a plurality of access accounts to the information processing apparatus in response to receiving an acquisition request from the information processing apparatus, a determination step of determining whether the plurality of access accounts satisfies a requisite, and a storing step of storing the access account that satisfies the requisite based on a determination in the determination step that the requisite is satisfied.

According to a tenth aspect, a program causes a computer for controlling a device management apparatus that manages a plurality of information processing apparatuses to function as, a registration unit for registering an access account, and a transmission unit for transmitting a plurality of access accounts to the information processing apparatus in response to receiving an acquisition request from the information processing apparatus.

According to an eleventh aspect, a program causes a computer for controlling an information processing apparatus managed by a device management apparatus to function as a determination unit for determining whether a plurality of access accounts satisfies a requisite, and storage unit for storing one of the plurality of access accounts that satisfies the requisite based on a determination by a determination unit that the requisite is satisfied.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing system comprising a plurality of information processing apparatuses and a device management apparatus that manages the plurality of information processing apparatuses, the device management apparatus including:
    device management circuitry configured to:
        register a plurality of access accounts for managing the plurality of information processing apparatuses; and
        transmit, in response to receiving an acquisition request from a particular information processing apparatus of the plurality of information processing apparatuses, the plurality of access accounts to the particular information processing apparatus, and
    the particular information processing apparatus including:
        a memory;
        information processing circuitry configured to:
            receive a registration of a device account from a user;
            store the device account including user identification information in the memory;
            determine that a requisite is satisfied in a case in which user identification information included in a matching access account of the plurality of access accounts matches the user identification information included in the device account;

transmit a registration request to the device management apparatus, wherein the registration request includes the matching access account that satisfies the requisite and includes identification information of the particular information processing apparatus; and store one of the plurality of access accounts that satisfies the requisite, wherein the one of the plurality of access accounts that is stored being the matching access account, wherein the device management circuitry is further configured to:

responsive to receipt of the registration request, store and associate the received matching access account with the received identification information of the particular information processing apparatus; and further communicate with the particular information processing apparatus using the stored matching access account associated with the stored identification information of the particular information processing apparatus.

2. The information processing system of claim 1, wherein the device management circuitry is configured to:

store the matching access account in an account storage area for the information processing apparatus; and in response to receiving the acquisition request from the information processing apparatus, transmit the matching access account stored in the account storage area.

3. The information processing system of claim 1, wherein the information processing circuitry is further configured to:

register a device account including user authority information; and determine that the requisite is satisfied in a case the user authority information included in a device account corresponding to the matching access account includes a predetermined authority.

4. The information processing system of claim 1, wherein the information processing circuitry is further configured to acquire the matching access account again from the device management apparatus in response to a restart of the information processing apparatus.

5. The information processing system of claim 1, wherein the information processing circuitry is further configured to acquire the matching access account again from the device management apparatus in response to a restart of an application installed in the information processing apparatus.

6. A method for changing setting, executed by an information processing system comprising a plurality of information processing apparatuses and a device management apparatus that manages the plurality of information processing apparatuses, the method including:

with the device management apparatus, registering a plurality of access accounts for managing the plurality of information processing apparatuses;

with the device management apparatus, transmitting, in response to receiving an acquisition request from a particular information processing apparatus of the plurality of information processing apparatuses, the plurality of access accounts to the particular information processing apparatus;

with the particular information processing apparatus, receiving a registration of a device account from a user;

with the particular information processing apparatus, storing the device account including user identification information in a memory;

with the particular information processing apparatus, determining that a requisite is satisfied in a case in which user identification information included in a matching access account of the plurality of access accounts matches the user identification information included in the device account;

with the particular information processing apparatus, transmitting a registration request to the device management apparatus, wherein the registration request includes the matching access account that satisfies the requisite and includes identification information of the particular information processing apparatus;

with the particular information processing apparatus, storing one of the plurality of access accounts that satisfies the requisite, wherein the one of the plurality of access accounts that is stored being the matching access account;

with the device management apparatus, responding to receipt of the registration request, store and associate the received matching access account with the received identification information of the particular information processing apparatus; and with the device management apparatus, further communicating with the particular information processing apparatus using the stored matching access account associated with the stored identification information of the particular information processing apparatus.

* * * * *